Patented Mar. 10, 1931

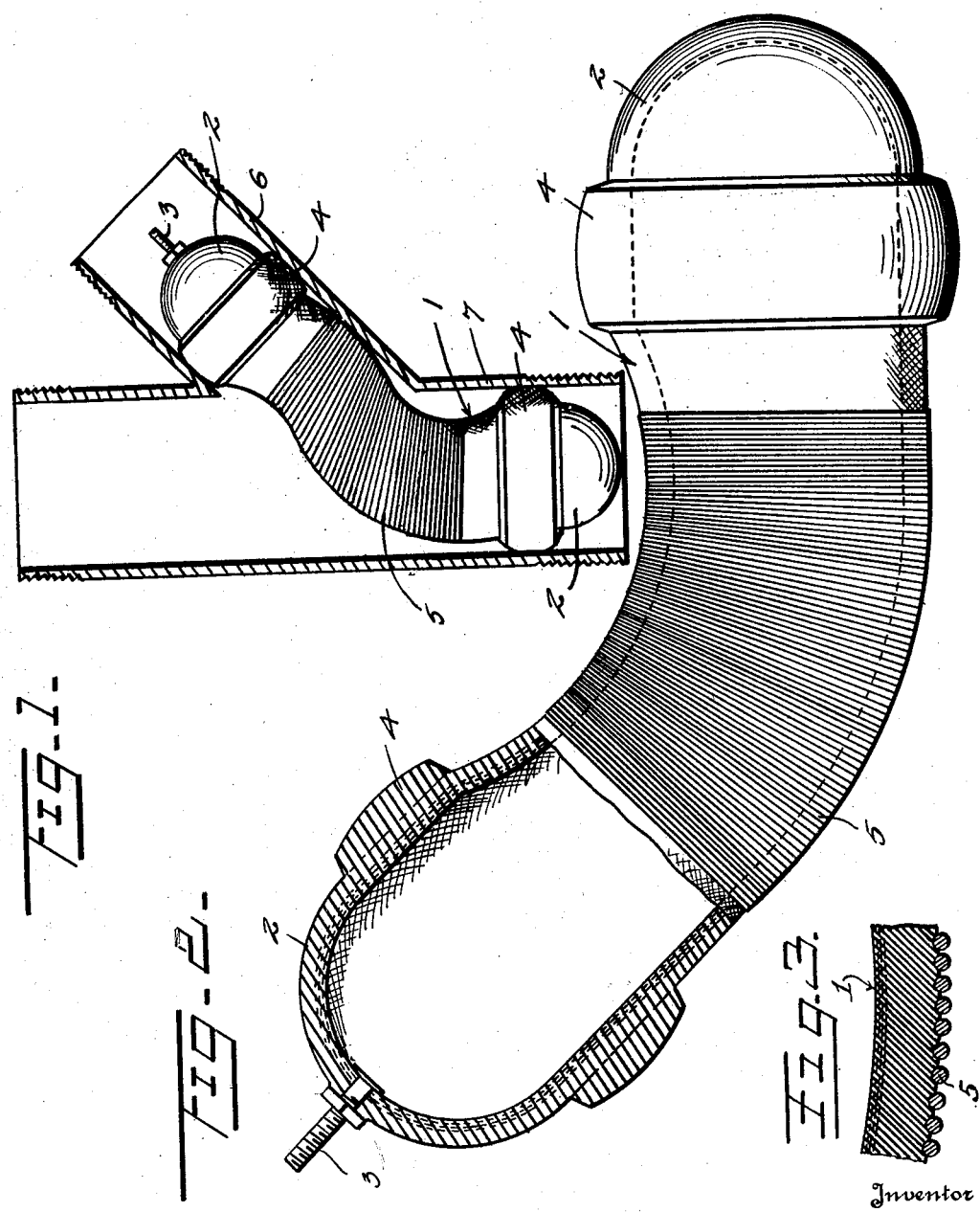

1,795,848

UNITED STATES PATENT OFFICE

HARRY DREES, OF INDIANAPOLIS, INDIANA

PNEUMATIC Y-BRANCH TEST PLUG

Application filed August 24, 1929. Serial No. 388,221.

This invention relates to devices designed for use in closing pipes or pipe fittings when the same are to be subjected to tests for imperfections and relates more particularly to a plug designed to close Y or elbow fittings for this purpose.

The primary object of the present invention is to provide a pneumatic plug which may be readily introduced into a fitting and inflated to positively and completely close the same so that the test upon the piping will be accurate and reliable.

The invention broadly contemplates the provision of a hollow body having closed rounded ends and formed of a sturdy flexible material such as rubber reinforced fabric. Adjacent each end, the body has formed thereabout a broad heavy band of relatively soft rubber and intermediate its ends between the bands, the body is wrapped with light wire to prevent rupture when air under pressure is injected thereinto by a valve mounted at one end.

The invention will be best understood from a consideration of the following detailed description taken in connection with the accompanying drawing forming a part of the present specification with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view of the device embodying the present invention showing the same in side elevation and in applied position.

Figure 2 is an enlarged view of the plug showing the same partly in section and partly in elevation.

Figure 3 is a fragmentary enlarged longitudinal section showing in detail the mounting of the wire reinforcement on the flexible bag.

Referring more particularly to the drawing wherein like numerals of reference indicate corresponding parts throughout the several views, the numeral 1 indicates the plug body as a whole, the same being preferably constructed of a rubber treated fabric of a construction similar to the air bags employed in tire vulcanizers. As shown, the plug is of elongated cylindrical formation and has each end closed by the semi-spherical walls 2, one of which has extended therethrough an air valve 3 which may be of the type commonly used upon automobile tire inner tubes.

Adjacent each end there is vulcanized to and about the plug body a broad relatively heavy band 4 of soft rubber.

Between the bands 4 the body has wrapped thereabout a wire reinforcement 5 which is embedded in the body which acts to prevent rupture of this part of the plug when the same is in use and at the same time prevents complete collapse of the body.

In Figure 1 the application of the plug to a Y fitting is shown, the plug being inserted into the fitting through the lateral branch 6 thereof while the fitting is in position in a pipe line. The pipe sections of the line in which the fitting is placed are not shown. The permanent slightly arcuate contour of the body facilitates the ready insertion of the same into the fitting, as will be apparent, and it is of course understood that the body is inserted in a deflated condition and after being properly positioned air is injected thereinto through the valve 3 to distend the body and thus bring about firm contact between the bands 4, which as previously described are preferably of soft rubber, and the wall of the enclosing body.

Air may then be introduced into the pipe line of which the fitting 7 forms a part to test the pipe for imperfections, the bands 4 of the plug preventing the air passing through the lateral arm of the fitting and also beyond the plug into the rest of the pipe.

The wire reinforcing material 5 about the central portion of the body prevents bulging or breaking of the body when the same is in the condition shown, as it will be obvious that this part of the body becomes subjected to a great deal of strain when air under high pressure is introduced therein and particularly when the body is bent in the manner shown.

From the foregoing description it will be readily seen that test plugs of the character herein described may be easily and economically made and are easy to use and will effectively close the body into which they are introduced.

While the present testing plug has been shown in association with a Y fitting and the descriptive matter has been confined to its employment in such a fitting, it is of course to be understood that I do not wish to be limited in any manner to the use of the fitting in this way for it will be obvious that the same may be used in a straight pipe or in fittings of other form.

Having thus described my invention, what I claim is:—

1. A test plug of the character described comprising an elongated hollow body having each end closed, an air valve opening through the wall of the body, contact bodies surrounding each end of the hollow body for engagement with the wall of a pipe to be tested when the hollow body is inflated, and reinforcing means about the hollow body between said contact bodies whereby to prevent collapsing of the body upon deflation thereof, or stretching of the intermediate portion upon inflation thereof.

2. A test plug of the character described comprising an elongated hollow body having each end closed, an air valve opening through the wall of the body contact bodies surrounding each end of the hollow body for engagement with the wall of a pipe to be tested when the hollow body is inflated and reinforcing wire imbedded in and wrapped about the hollow body intermediate the ends thereof to prevent rupture of the body when in use and to prevent collapsing of the body when not in use.

In testimony whereof I hereunto affix my signature.

HARRY DREES.